(12) United States Patent  
Helm

(10) Patent No.: US 9,369,852 B2  
(45) Date of Patent: Jun. 14, 2016

(54) MESSAGING FOR MOBILE DEVICES USING VEHICLE DCM

(71) Applicant: Toyota Motor Engineering & Manufacturing North America, Inc., Erlanger, KY (US)

(72) Inventor: Sean L. Helm, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 30 days.

(21) Appl. No.: 14/479,408

(22) Filed: Sep. 8, 2014

(65) Prior Publication Data

US 2016/0073240 A1    Mar. 10, 2016

(51) Int. Cl.
*H04M 1/725*  (2006.01)
*H04W 4/12*   (2009.01)
*H04W 4/00*   (2009.01)

(52) U.S. Cl.
CPC ............. *H04W 4/12* (2013.01); *H04M 1/7255* (2013.01); *H04M 1/72552* (2013.01); *H04W 4/008* (2013.01)

(58) Field of Classification Search
CPC .... H04W 4/12; H04W 4/008; H04L 12/5895; H04L 12/587; H04M 1/72547; H04M 3/537; H04M 1/72552
See application file for complete search history.

(56) References Cited

U.S. PATENT DOCUMENTS

| 7,689,253 | B2 | 3/2010 | Basir | |
|---|---|---|---|---|
| 8,306,560 | B2 | 11/2012 | Krause et al. | |
| 8,718,632 | B2 | 5/2014 | DiMeo et al. | |
| 2004/0267527 | A1* | 12/2004 | Creamer | G10L 15/26 704/235 |
| 2005/0143134 | A1* | 6/2005 | Harwood | H04M 1/271 455/563 |
| 2009/0024707 | A1 | 1/2009 | Aase et al. | |
| 2012/0035923 | A1* | 2/2012 | Krause | H04W 4/18 704/235 |
| 2012/0231821 | A1* | 9/2012 | Swanson | H04W 4/12 455/466 |
| 2012/0239761 | A1* | 9/2012 | Linner | G06F 17/2765 709/206 |
| 2013/0157699 | A1* | 6/2013 | Talwar | H04L 51/18 455/466 |
| 2015/0088784 | A1* | 3/2015 | Dhara | G06N 5/02 706/11 |

* cited by examiner

*Primary Examiner* — Kashif Siddiqui

(74) *Attorney, Agent, or Firm* — Christopher G. Darrow; Darrow Mustafa PC

(57) ABSTRACT

Disclosed are computing devices, systems, and methods for messaging for mobile devices using a vehicle data communications module (DCM). A computing device associated with a vehicle can receive an incoming message sent to a driver's mobile device using a Bluetooth connection with the mobile device. The message can be presented to the driver over the vehicle's audio system using text-to-speech processing. The driver can compose an outgoing message as a reply, such as using speech-to-text processing, which can be sent to a remote server to forward to the intended third-party recipient. If the third party replies to the outgoing message directly, the remote server can receive the reply and forward it to the vehicle computing device. All related messages can be presented to the driver as a single thread or conversation.

24 Claims, 3 Drawing Sheets

MESSAGING FOR MOBILE DEVICES USING VEHICLE DCM

BACKGROUND

This disclosure relates to vehicle telematics, and more particularly to devices, systems, and methods for sending and receiving messages using a vehicle data communications module (DCM). Consumer vehicles can be equipped with short-range wireless data connections, such as those utilizing the Bluetooth™ standards, that allow the driver to connect a mobile phone or other mobile device to the vehicle's multimedia system (sometimes referred to as the vehicle's "head unit," controlled by a computing device). With the phone connected to the head unit using the Bluetooth connection, the driver can use the vehicle's audio system, including speakers and microphones, for a phone call made by the phone to an outside party.

In addition, data such as emails and text messages can also be sent from the phone or other mobile device to the vehicle head unit using the Bluetooth connection. This allows the driver to read the emails or text messages on the vehicle's display rather than on the phone. Alternately, the vehicle head unit can employ text-to-speech conversion to read the emails or text messages aloud, which can increase driver safety and does not require the driver to divert attention from the road.

Vehicle head units can also include voice recognition capabilities to allow the driver to issue spoken commands to control vehicle functions. These voice recognition capabilities can allow the vehicle head unit to convert the driver's speech to text, thereby allowing the driver to dictate an outgoing email or text message or to reply to a previously received email or text message in a safe manner. However, some mobile devices do not support receiving this type of data from the vehicle over the Bluetooth connection. As an example, some versions of the Apple iPod's operating system do not support sending an email or text message composed using an external device (such as the vehicle head unit) and sent to the iPod over the Bluetooth connection.

SUMMARY

Disclosed herein are computing devices, systems, and methods for messaging for mobile devices using a vehicle DCM. In one example implementation, a computing device connected to or part of a vehicle head unit can receive incoming messages sent to a driver's mobile device using a Bluetooth connection. A message can be presented to the driver by the computing device, for example using the vehicle's audio system by employing text-to-speech processing. The driver can compose an outgoing message in reply using the computing device, such as through speech-to-text processing. The outgoing message can be sent using the vehicle's DCM via a remote server, such as located in a centralized data center, which data center server can forward the outgoing message to a third party (for example, the third party may be the sender of the original message). The outgoing message can include information and/or metadata identifying the DCM for further reply purposes. If the third party further replies to the outgoing message, the new incoming message can be directly received by the data center server, which can forward it to the computing device.

In one implementation, a computing device for a vehicle is disclosed. The computing device includes: one or more processors for controlling the operations of the computing device; and a memory for storing data and program instructions used by the one or more processors, wherein the one or more processors are configured to execute instructions stored in the memory to: receive, from a mobile device using a local data connection, a first incoming message originating from a remote sender; send, to a server computer using a data communications module, an outgoing message for distribution to a remote recipient in response to the first incoming message; receive, from the server computer using the data communications module, a second incoming message originating from the remote recipient; determine a logical grouping comprising at least the first incoming message and the second incoming message; and present the logical grouping to the driver of the vehicle.

In another implementation, a computer-implemented method for a vehicle is disclosed. The method includes: receiving, from a mobile device using a local data connection, a first incoming message originating from a remote sender; sending, to a server computer using a data communications module, an outgoing message for distribution to a remote recipient in response to the first incoming message; receiving, from the server computer using the data communications module, a second incoming message originating from the remote recipient; determining a logical grouping comprising at least the first incoming message and the second incoming message; and present the logical grouping to a driver of the vehicle and presenting the logical grouping to a driver of the vehicle.

In another implementation, a system is disclosed, which system includes: a server computer; and a computing device associated with a vehicle in communication with the server computer; wherein the computing device is configured to: receive, from a mobile device using a local data connection, a first incoming message originating from a remote sender; send, to the server computer using a data communications module, an outgoing message for distribution to a remote recipient in response to the first incoming message; receive, from the server computer using the data communications module, a second incoming message originating from the remote recipient; determine a logical grouping comprising at least the first incoming message and the second incoming message; and present the logical grouping to a driver of the vehicle.

DETAILED DESCRIPTION

Disclosed herein are computing devices, systems, and methods for messaging for mobile devices using a vehicle DCM. In one example implementation, a computing device associated with a vehicle can receive an incoming message previously sent to a driver's mobile device using a Bluetooth connection. The message can be presented to the driver by the computing device, for example over the vehicle's audio system using text-to-speech processing. The driver can compose an outgoing message in reply using the computing device, such as through speech-to-text processing. The outgoing message can be sent using the vehicle's DCM via a remote server, for example, a server located in a centralized data center. The data center server can forward the outgoing message to a third party (for example, the third party may be the sender of the original message). The outgoing message can include information and/or metadata identifying the DCM for further reply purposes. The outgoing message can also include a note, such as in a signature area, notifying the third party that the outgoing message was sent by the DCM. The outgoing message can also indicate to the third party that the outgoing message was in reply to the third party's original message. If the third party further replies to the outgoing message, the new incoming message can be directly received by the data center server, which can forward it to the computing device. The computing device can associate all related messages (such as involving the same "conversation" or "thread") even where the messages are received from different sources or using different messaging accounts (for example, where the original incoming message was transferred from the mobile device using the Bluetooth connection, and the direct incoming message was received by the data center server and forwarded directly to the computing device).

Figure 1:
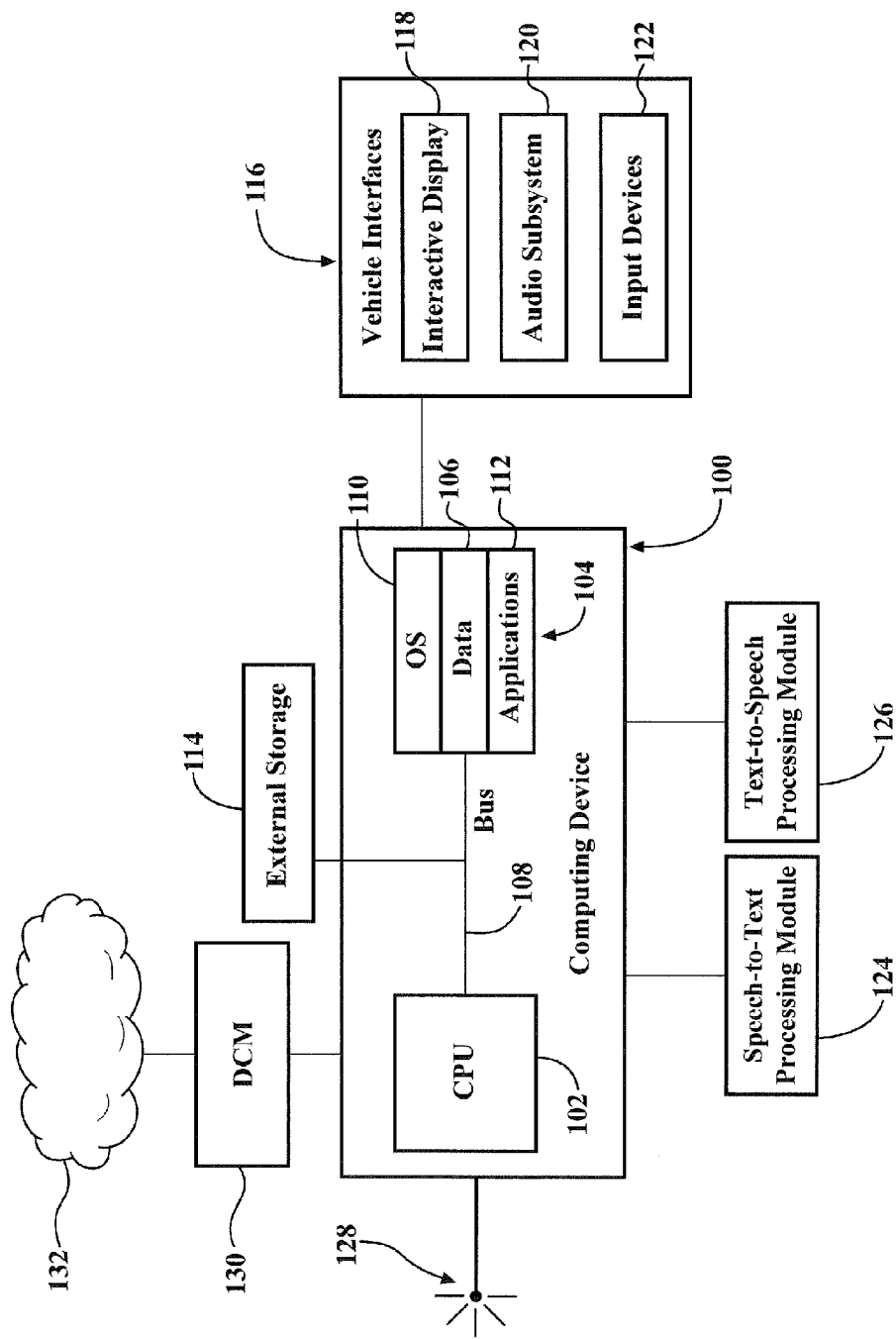
FIG. 1 is a schematic block diagram of a computing device for mobile messaging using a vehicle DCM.

FIG. 1 is a schematic block diagram of a computing device 100 for mobile messaging using a vehicle DCM. The computing device 100 can be any type of vehicle-installed, handheld, desktop, or other form of single computing device, or can be composed of multiple computing devices. A processing unit 102 in the computing device 100 can be a conventional central processing unit (CPU) or any other type of device, or multiple devices, capable of manipulating or processing information. A memory 104 in the computing device 100 can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs or apps that permit the CPU 102 to implement the remote vehicle commands, as described in more detail below. The computing device 100 can also include secondary, additional, or external storage 114, for example, a memory card, flash drive, or any other form of computer readable medium. In one implementation, the installed applications 112 can be stored in whole or in part in the external storage 114 and loaded into the memory 104 as needed for processing.

The computing device 100 can be in direct or indirect communication with one or more vehicle interfaces 116 through which the driver can receive notifications and send commands to the computing device 100. Example vehicle interfaces 116 can include an interactive display 118, an audio subsystem 120 (which can include speakers and/or microphones), and/or various physical input devices 122 such as buttons, knobs, and the like. The computing device 100 can also include a voice recognition system including a speech-to-text processing module 124 and a text-to-speech processing module 126.

The computing device 100 can include a short-range wireless data connection such as a Bluetooth connection 128. The Bluetooth connection 128 can employ the protocol standard described by the Bluetooth™ Special Interest Group, but any other short-range wireless data connection using a different standard or protocol can also be used without departing from the spirit of the instant disclosure. The computing device 100 can also include a DCM 130 with which the computing device 100 can communicate with remote sources through a network 132, such as the internet.

Figure 2:
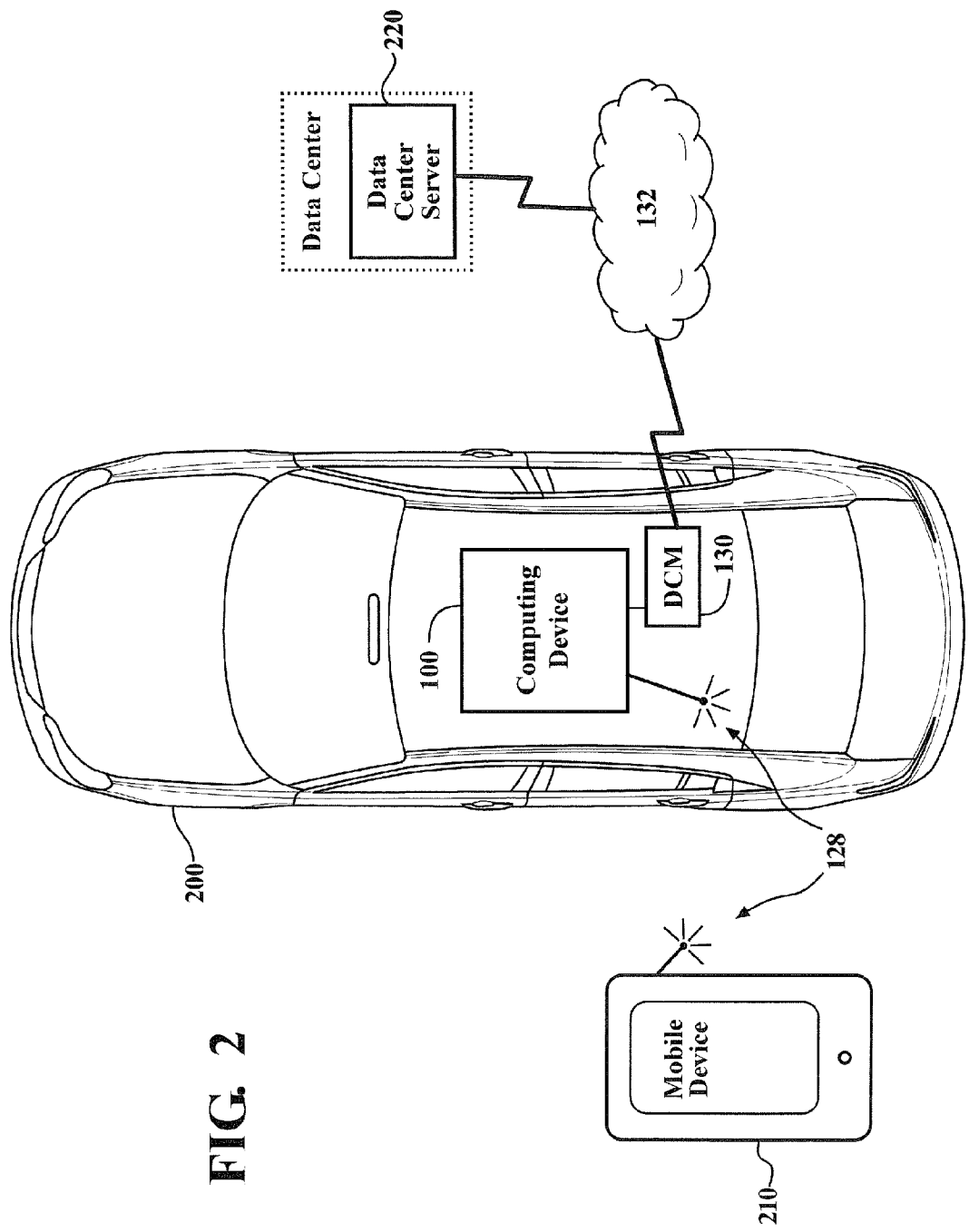
FIG. 2 is a pictorial representation of a vehicle including the computing device of FIG. 1, in communication with a mobile device and a central server.

FIG. 2 is a pictorial representation of a vehicle including the computing device 100 of FIG. 1, in communication with a mobile device and a central server. The computing device 100 can be located within the vehicle 200 or can be located remotely from the vehicle 200 in an alternate location. If the computing device 100 is remote from the vehicle, the vehicle 200 can include the capability of communicating with the computing device 100, such as through the DCM 130.

The computing device 100 can be in direct or indirect communication with a mobile device 210 accessible via a local data connection, including using the Bluetooth connection 128. The Bluetooth connection generally requires that the mobile device 210 be physically located in or near the vehicle 200, or is otherwise in close proximity. The computing device 100 can also be in direct or indirect communication with a data center server 220 accessible to the network 132, including using the DCM 130.

In one example implementation, the computing device 100 and/or the DCM 130 can be configured to prevent communication with any source other than the central server 220. This can be implemented using encryption techniques known in the art and could protect the vehicle from malicious data attacks. Accordingly, in this implementation, all remote communication between the computing device 100 and third parties can pass through the central server 220. For example, for the computing device to send a message to a remote third party, the message can be sent directly to the data center server 220, which will forward the message to the intended third-party recipient, such as through the network 132 or another network.

In one example implementation, the driver can receive a message (hereinafter referred to as the "original incoming message") on the mobile device 210, which message can be transmitted to the computing device 100 via the Bluetooth connection 128. The computing device 100 can present the original incoming message to the driver using the interactive display 118, which can be part of or connected to the vehicle's 200 head unit. Alternately, the computing device 100 can convert the original incoming message to audio using the text-to-speech processing module 126 and present it to the driver audibly using the audio subsystem 120. After being notified of the original incoming message, the driver may desire to reply to it or forward it to someone else (such message hereinafter referred to as the "outgoing message").

The driver can compose the outgoing message as audio or text using the computing device 100 and the vehicle interfaces 116. In one implementation, the computing device 100 can receive audio input from the audio subsystem 120 and can convert the driver's speech to a textual messaging using the speech-to-text processing module 124. The computing device 100 can then send the outgoing message, using the DCM 130, to the data center server 220, which will send the outgoing message to the intended recipient (who may be the person who sent the original incoming message or another party). Composing and sending the outgoing message using the computing device 100 rather than the driver's mobile device 210 can be advantageous for several reasons. For example, using the mobile device 210 while driving can be unsafe, as well as unlawful in many jurisdictions. In addition, using the computing device's 100 speech-to-text processing module 124 to compose the outgoing message directly on the mobile device 210 may not be possible, as the mobile device 210 may not support receiving such input from the computing device 100 over the Bluetooth connection 128 for the purpose of composing an outgoing message on the mobile device 210 (that is, even where the mobile device 210 would support receiving audio input from headsets and hands-free devices over the Bluetooth connection 128 for phone calls). However, because the DCM 130 includes a network connection allowing it to communicate with the data center server 220, the outgoing message can be sent over the network 132 directly from the computing device 100 without relying on the use of the mobile device's 210 own network connection.

In one example implementation, the content of the original incoming message can be appended to the content of the outgoing message, further indicating the relationship between the original incoming message and the outgoing message (e.g., that the outgoing message is a reply or forward). A note or signature line can also be applied to the outgoing message stating that the message has been composed using the computing device 100 (for example, a note such as "Sent using vehicle telematics" or any other note set by the manufacturer or driver). This note or signature line can be applied to the outgoing message either by the computing device 100 or by the data center server 220 when it is received there.

In one example implementation, the DCM 130 can have a unique identifier to identify the particular vehicle 200 to the data center server 220. This unique identifier can be based on the vehicle's 200 vehicle identification number (VIN) or another address or code that uniquely identifies the DCM 130 and/or the vehicle 200. The unique identifier can be included in the outgoing message, for example in metadata included in the outgoing message.

In one example implementation, the driver can be uniquely identified as well, such as with a unique email address associated with the data center server 220. This email address can be stored in a driver profile located at the data center server 220 or elsewhere. The driver email address can be used in the "from" field in the outgoing message so the third-party recipient can see who sent the message. The data center server 220 can associate the driver's email address with the DCM's 130 or the vehicle's 200 unique identifier so that any messages the data center server 220 receives addressed to the driver's email address can be automatically forwarded to the computing device 100.

In one implementation, multiple drivers of the vehicle 200 can each have their own unique email addresses. A driver can be identified based on the particular mobile device 210 paired with the computing device over the Bluetooth connection 128. Other identification schemes are also possible, for example, based on a unique signal generated by the driver's key fob, without departing from the scope of this disclosure.

If the data center server 220 receives a message intended for the driver directly from a third party (as opposed to the computing device 100 receiving the message from the mobile device 210 using the Bluetooth connection 128), the data center server 220 can send such message (hereinafter referred to as the "direct incoming message") to the computing device 100. The data center server 220 can route the direct incoming message based on an email address, for example, if the driver has a unique email address at the data center server's 220 domain, as described above. Alternatively, even without implementing unique driver email addresses, since the outgoing message sent by the driver can include a unique identifier identifying the DCM 130 or the vehicle 200 (for example, in the outgoing message's metadata, as described above), where the direct incoming message is a reply to the outgoing message, the data center server 220 can route the direct incoming message to the appropriate vehicle 200.

In one example implementation, upon receiving the direct incoming message from the data center server 220, the computing device 100 can present the message to the driver using the interactive display 118 or using the audio subsystem 120, after converting the message to audio using the text-to-speech processing module 126. Additionally, the computing device 100 can associate all related messages (that is, messages in the same "conversation" or "thread") and present them to the driver as a logical group, for example including the original incoming message, outgoing message, and direct incoming message. This grouping can be done even where the original incoming message was sent to the mobile device 210 (and transferred to the computing device via the Bluetooth connection 128) and the direct incoming message was sent to the data center server 220, in the cases where each message is a reply of the previous message and thus the messages are related.

In another example implementation, the data center server 220 can store the driver's login information/credentials for the driver's primary email account. Alternatively, the credentials can be stored locally at the computing device 100 (for example, in memory 104 or external storage 114) and can be sent to the data center server 220 for each outgoing message through an encrypted data connection between the DCM 130 and the data center server 220 over the network 132. In either case, when the data center server 220 sends the outgoing message (composed by the driver using the computing device 100), the data center server 220 can login to the driver's email account and send the outgoing message through such email account, for example using SMTP or IMAP mail protocols or other similar mail protocols familiar in the art.

Figure 3:
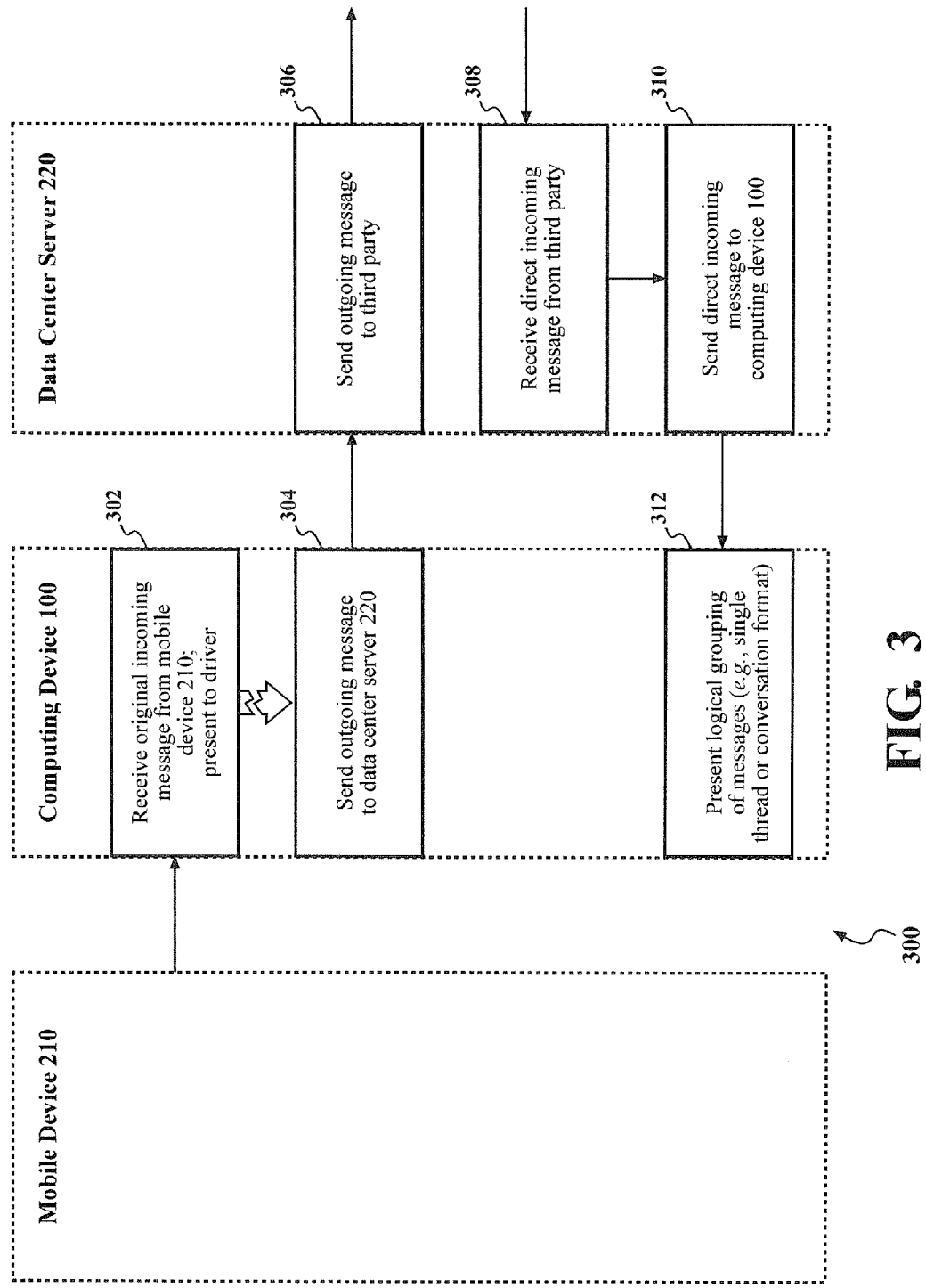
FIG. 3 is a logic flowchart of an example process for mobile messaging using a vehicle DCM.

FIG. 3 is a logic flowchart of an example process 300 for mobile message using the DCM 100. At step 302, the original incoming message is received by the computing device 100 from the mobile device 210 using the Bluetooth connection 128, and the computing device 100 presents the original incoming message to the driver, for example, using the interactive display 118 or audio subsystem 120 (including employing the text-to-speech processing module 126).

At such time as the driver composes an outgoing message in reply to the original incoming message, the process 300 continues to step 304. At step 304, the computing device 100 sends the outgoing message to the data center server 220 using the DCM 130. At step 306, the data center server 220 sends the outgoing message to the intended third-party recipient. As described above in this disclosure, the outgoing message sent by the data center server 220 can include a unique identifier unique to the vehicle 200 or DCM 130 or a unique email address unique to the driver (which unique email address can, in turn, be associated with the vehicle's 200 or the DCM's 130 unique identifier). Alternatively, the data center server 220 can send the outgoing message through the driver's email account (and the associated mail servers) using login credentials supplied by the driver. The outgoing message can also include the content from the original incoming message and/or an added note or signature portion.

When the data center server 220 receives a reply in the form of a direct incoming message, the process continues to step 308. At step 308, the data center server 220 receives the direct incoming message from the third party to whom the outgoing message was sent. At step 310, based on a unique identifier associated with the DCM 130 contained in the direct incoming message, the data center server 220 sends the direct incoming message to the computing device 100 using the DCM 130. The unique identifier may be associated with DCM 130 directly, or it may be associated with the DCM 130 indirectly—for example, the direct incoming message can include a unique identifier associated with the driver, and the data center server 220 can then send the message to the DCM 130 associated with that driver. At step 312, the computing device 100 presents the direct incoming message to the driver grouped logically (such as in a "thread" or "conversation"

format) with related messages, including, for example, the original incoming message and the outgoing message.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. For example, in the embodiments described above, the vehicle 200 is generally described an automobile. However, the vehicle 200 is not limited to an automobile, as the disclosed systems and methods could also be implemented with other vehicles generally controlled by a driver, or operator, such as airplanes, boats, trains, etc. The scope of the claims is thus to be accorded the broadest interpretation so as to encompass all such modifications and equivalent structures as is permitted under the law.

What is claimed is:

1. A computing device for a vehicle comprising:
   one or more processors for controlling the operations of the computing device; and
   a memory for storing data and program instructions used by the one or more processors, wherein the one or more processors are configured to execute instructions stored in the memory to:
      receive, from a mobile device using a local data connection, a first incoming message originating from a remote sender;
      send, directly to a server computer using a data communications module, an outgoing message for distribution to a remote recipient in response to the first incoming message, whereby the outgoing message is sent to the server computer without using the mobile device or the local data connection;
      receive, directly from the server computer using the data communications module, a second incoming message originating from the remote recipient, whereby the second incoming message is received from the server computer without using the mobile device or the local data connection; and
      present the second incoming message within the vehicle.

2. The computing device of claim 1, wherein the local data connection is a short-range wireless data connection.

3. The computing device of claim 1, wherein the outgoing message is composed using a speech-to-text processing module.

4. The computing device of claim 1, wherein at least one of the first incoming message and the second incoming message is presented to the driver using a text-to-speech processing module.

5. The computing device of claim 1, wherein at least one of the first incoming message and the second incoming message is presented to the driver using an interactive display.

6. The computing device of claim 1, wherein the outgoing message includes a unique identifier associated with the computing device.

7. The computing device of claim 1, wherein the outgoing message includes a unique identifier associated with the driver.

8. A computer-implemented method for a vehicle comprising:
   receiving, from a mobile device using a local data connection, a first incoming message originating from a remote sender;
   sending, directly to a server computer using a data communications module, an outgoing message for distribution to a remote recipient in response to the first incoming message, whereby the outgoing message is sent to the server computer without using the mobile device or the local data connection;
   receiving, directly from the server computer using the data communications module, a second incoming message originating from the remote recipient, whereby the second incoming message is received from the server computer without using the mobile device or the local data connection; and
   presenting the second incoming message within the vehicle.

9. The method of claim 8, wherein the local data connection is a short-range wireless data connection.

10. The method of claim 8, wherein the outgoing message is composed using a speech-to-text processing module.

11. The method of claim 8, wherein at least one of the first incoming message and the second incoming message is presented to the driver using a text-to-speech processing module.

12. The method of claim 8, wherein at least one of the first incoming message and the second incoming message is presented to the driver using an interactive display.

13. The method of claim 8, wherein the outgoing message includes a unique identifier associated with the computing device.

14. The method of claim 8, wherein the outgoing message includes a unique identifier associated with the driver.

15. A system comprising:
   a server computer; and
   a computing device associated with a vehicle in communication with the server computer; wherein the computing device is configured to:
      receive, from a mobile device using a local data connection, a first incoming message originating from a remote sender;
      send, directly to a server computer using a data communications module, an outgoing message for distribution to a remote recipient in response to the first incoming message, whereby the outgoing message is sent to the server computer without using the mobile device or the local data connection;
      receive, directly from the server computer using the data communications module, a second incoming message originating from the remote recipient, whereby the second incoming message is received from the server computer without using the mobile device or the local data connection; and
      present the second incoming message within the vehicle.

16. The system of claim 15, wherein the local data connection is a short-range wireless data connection.

17. The system of claim 15, wherein the outgoing message is composed using a speech-to-text processing module.

18. The system of claim 15, wherein at least one of the first incoming message and the second incoming message is presented to the driver using a text-to-speech processing module.

19. The system of claim 15, wherein at least one of the first incoming message and the second incoming message is presented to the driver using an interactive display.

20. The system of claim 15, wherein the outgoing message includes a unique identifier associated with the computing device.

21. The system of claim 15, wherein the outgoing message includes a unique identifier associated with the driver.

22. The computing device for a vehicle of claim 1, wherein the one or more processors are further configured to execute instructions stored in the memory to:
   determine a logical grouping comprising at least the first incoming message and the second incoming message, wherein presenting the second incoming message within the vehicle includes presenting the logical grouping within the vehicle.

23. The method of claim 8, wherein the method further includes:
  determining a logical grouping comprising at least the first incoming message and the second incoming message,
  wherein presenting the second incoming message within the vehicle includes presenting the logical grouping within the vehicle.

24. The system of claim 15, wherein the computing device is configured to:
  determine a logical grouping comprising at least the first incoming message and the second incoming message,
  wherein presenting the second incoming message within the vehicle includes presenting the logical grouping within the vehicle.

* * * * *